June 24, 1930.  N. L. DOOTSON  1,766,288
SHOCK ABSORBER
Filed Aug. 4, 1928  2 Sheets-Sheet 1
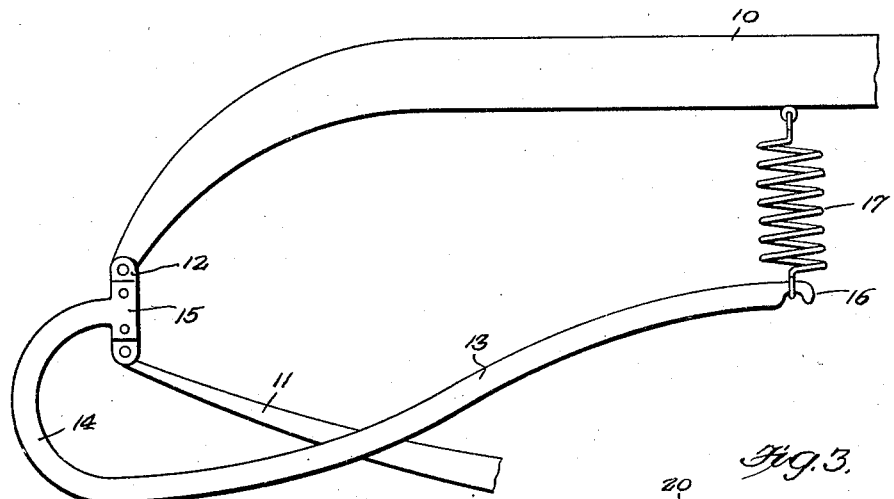
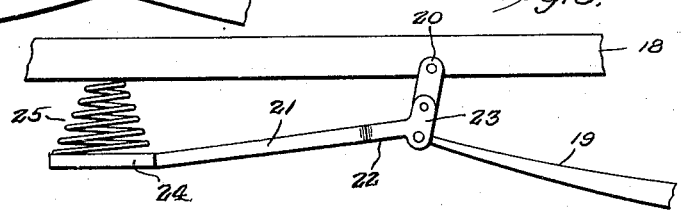
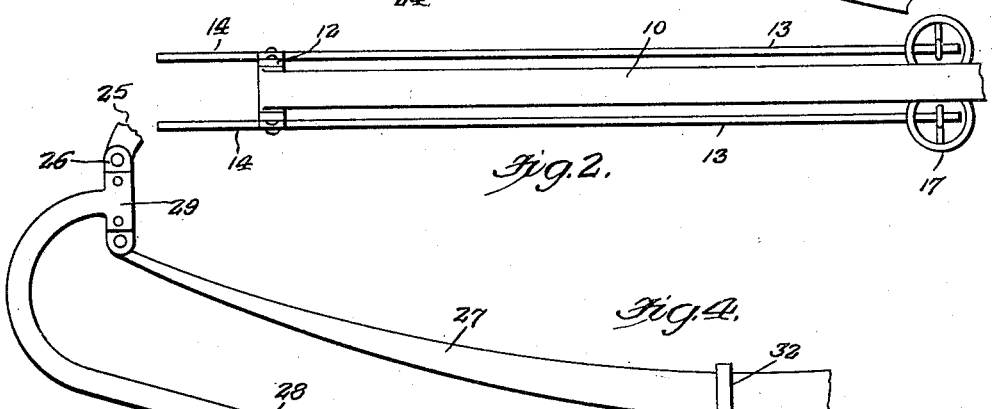
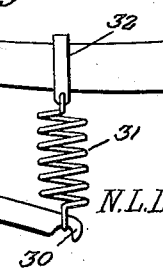
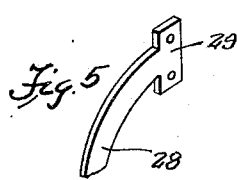
Inventor
N. L. Dootson,
By Clarence A. O'Brien
Attorney June 24, 1930. N. L. DOOTSON 1,766,288
SHOCK ABSORBER
Filed Aug. 4, 1928    2 Sheets-Sheet 2
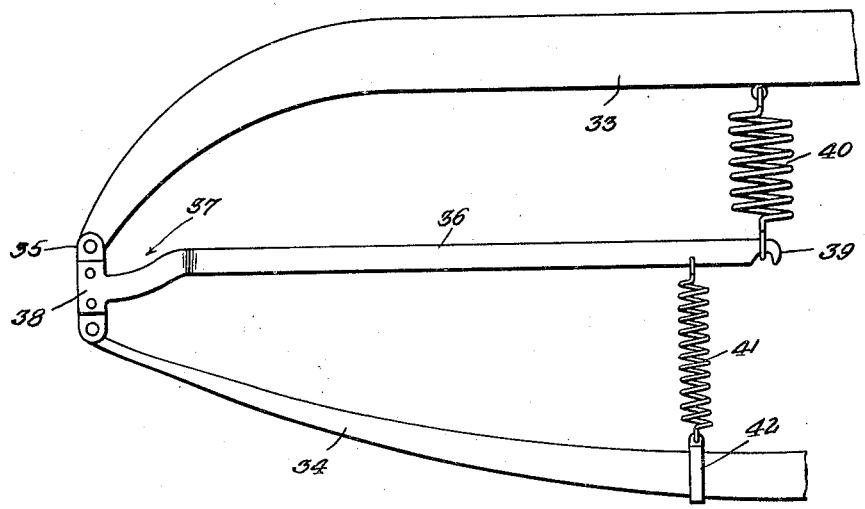
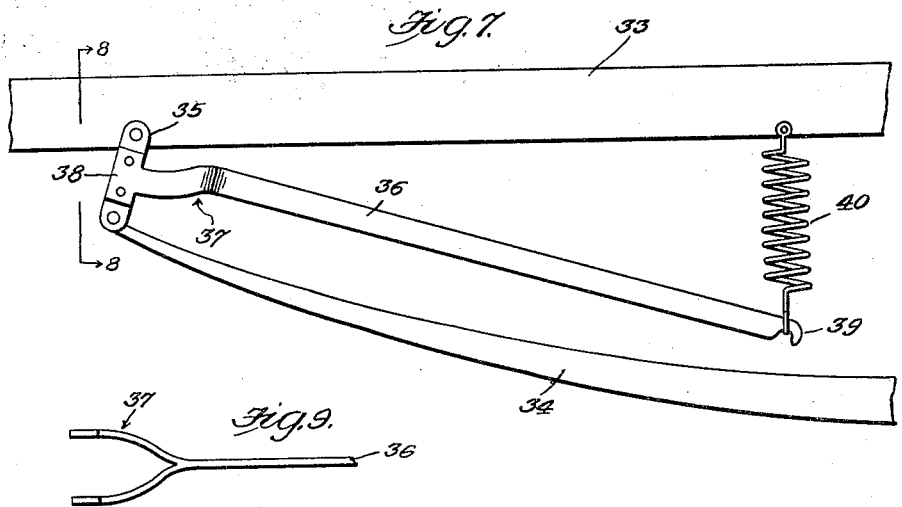
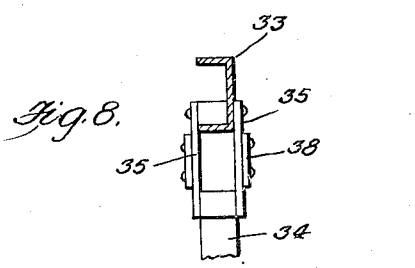
Inventor
N. L. Dootson,
By Clarence A. O'Brien
Attorney Patented June 24, 1930

1,766,288

UNITED STATES PATENT OFFICE

NORMAN L. DOOTSON, OF SAN FRANCISCO, CALIFORNIA

SHOCK ABSORBER

Application filed August 4, 1928. Serial No. 297,489.

The present invention relates broadly to an improved shock absorber and has more particular reference to one which is used in association with spring shackles.

In carrying out the invention, I provide several embodiments or species, each of which embodies the same principle of operation, in that it includes means directly associated with a swingable shackle link, said means being cooperable with cushioning means which is in turn, associated with the chassis frame, whereby to indirectly act upon the main spring to prevent a violent rebound and to supplement the resilient action of said main spring to render it more efficient in operation.

In the drawings:

Figure 1 is a fragmentary side elevational view of a chassis bar, a spring, a spring shackle and the auxiliary shackle attachment constructed in accordance with the present invention.

Figure 2 is a top plan view of Figure 1.

Figure 3 is a view showing a different embodiment of shackle appliance, such as is used, for instance, in connection with a set spring.

Figure 4 is a view showing a construction similar to that shown in Figures 1 and 2, wherein the spring action of the auxiliary absorber is applied differently.

Figure 5 is a fragmentary perspective view of one end portion of one of the parts, of said appliance.

Figure 6 is a view shown similar to Figure 1, of a still further embodiment of the invention embodying a single arm, and a double spring absorber.

Figure 7 is a view like Figure 6, showing one of the springs removed.

Figure 8 is a section taken approximately upon the line 8—8 of Figure 7.

Figure 9 is a fragmentary top plan view of one end portion of the arm seen in Figures 6 and 7.

Directing attention first to Figures 1 and 2, it will be seen that the reference character 10 designates a chassis bar, and 11 indicates the rear spring, and 12 the link of the shackle which connects the spring with the chassis bar. The attachment or appliance here shown comprises a pair of rearwardly, downwardly, forwardly and upwardly curved arms 13, whose rear end portions are curved as at 14 and provided with T-shaped heads 15, riveted or otherwise rigidly fastened to the link 12. These arms extend forwardly and intersect the spring 11, where they extend into the space between the spring and the chassis bar and terminate in hooks 16 connected with coiled tensioning springs 17. In this instance, the springs 17 are anchored upon the bars as is quite apparent from Figure 2.

In Figure 3, 18 designates the chassis bar, 19 a front spring, and 20 the shackle link. In this instance, I provide an arm 21 having a fork 22 having its front end terminating in connecting heads 23, connected rigidly with the shackle link 20. This arm terminates in an enlarged seat 24 at its rear end, with which a helical spring 25 is associated. This spring bears at its upper end against the under side of the chassis bar 18.

In Figure 4, 25 represents the chassis bar and 26 the shackle link and 27 the spring. Here I provide a pair of parallel spaced arms 28, whose curved end portions are provided with T-shaped heads 29 connected with the shackle links, and whose opposite end portions are formed with hooks 30, connected with coil springs 31, fastened to the spring 27, through the medium of a suitable clip 32. Coming now to Figure 6, 33 designates the chassis bar, 34 the spring, and 35 the shackle link. Here the appliance comprises a single arm 36 having a fork 37, whose arms terminate in heads 38, riveted or otherwise rigidly fastened to the shackle link. Again, this arm terminates in a hook 39, connected with the coil spring 40, fastened or otherwise anchored on the bar 33. Here there is a second coil spring 41, connected to the arm at a point spaced inwardly from the hook 39 and thence to the main spring 34, as at 42.

In Figure 7, the construction is substantially the same, except that it is applied to a front spring, and spring 41 and clip 42 are omitted. Hence, the same reference characters have been employed to designate identical parts. This is also true of Figures 8 and 9, wherein the same reference characters are employed.

It is thought that by considering the description in connection with the drawings, a clear understanding of the invention will be had, and therefore a more lengthy description is regarded as unnecessary.

Having thus described my invention, what I claim as new is:—

A device of the character described comprising, in combination, a chassis bar, a leaf spring, and shackle links pivotally connecting said bar and spring at their rear ends in spaced relation, a pair of rearwardly, downwardly, forwardly and upwardly curved spaced arms, an integral apertured T-head on the rear end of each arm rigidly secured to the links for mounting the arms thereon, said arms embracing the leaf spring therebetween intermediately their ends, said arms terminating intermediate the horizontal plane of the chassis bar and leaf spring, and means for resiliently connecting the same to the chassis at their free ends.

In testimony whereof I affix my signature.

NORMAN L. DOOTSON.